United States Patent [19]

Kuronen

[11] 4,281,639
[45] Aug. 4, 1981

[54] SOLAR HEATING SYSTEM

[76] Inventor: Seppo K. Kuronen, Ruuvikiya 2, 01650 Vantaa 65, Finland

[21] Appl. No.: 117,115

[22] Filed: Jan. 31, 1980

[51] Int. Cl.³ ............................................. I24J 3/02
[52] U.S. Cl. .................................. 126/435; 126/437; 126/449; 165/104.19
[58] Field of Search ........................ 126/436, 428–431, 126/437, 427, 435, 432, 449; 165/104 S, 106, 108, 140

[56] References Cited

U.S. PATENT DOCUMENTS

| | | | |
|---|---|---|---|
| 2,556,186 | 6/1951 | Hegenbarth | 165/108 |
| 4,034,738 | 7/1977 | Barber, Jr. | 126/428 |
| 4,062,346 | 12/1977 | Rapp, Jr. et al. | 126/430 |
| 4,088,115 | 5/1978 | Powell | 126/430 |
| 4,219,012 | 8/1980 | Bergen | 126/436 |

FOREIGN PATENT DOCUMENTS 2023806  1/1980  United Kingdom ...................... 126/437

Primary Examiner—James C. Yeung
Attorney, Agent, or Firm—Maky, Renner, Otto & Boisselle

[57] ABSTRACT

A closed circuit solar heating system in which hot air from the upper end of a southwardly sloping flat-plate solar heat collector is circulated through a lower heat exchanger in the lower portion of an upright insulated heat storage tank filled with liquid storage medium (water) and back through the collector for reheating the air as it flows through the collector from the lower end to the upper end thereof. The hot air flowing through the lower heat exchanger transfers heat to the water in the tank for storage. The system is further characterized in the provision of an upper heat exchanger in the upper portion of the tank to transfer heat stored in the water in the tank to room air circulated through the upper heat exchanger. Hot water for domestic use is provided by installing a coiled water supply tube in the heat storage tank.

2 Claims, 5 Drawing Figures

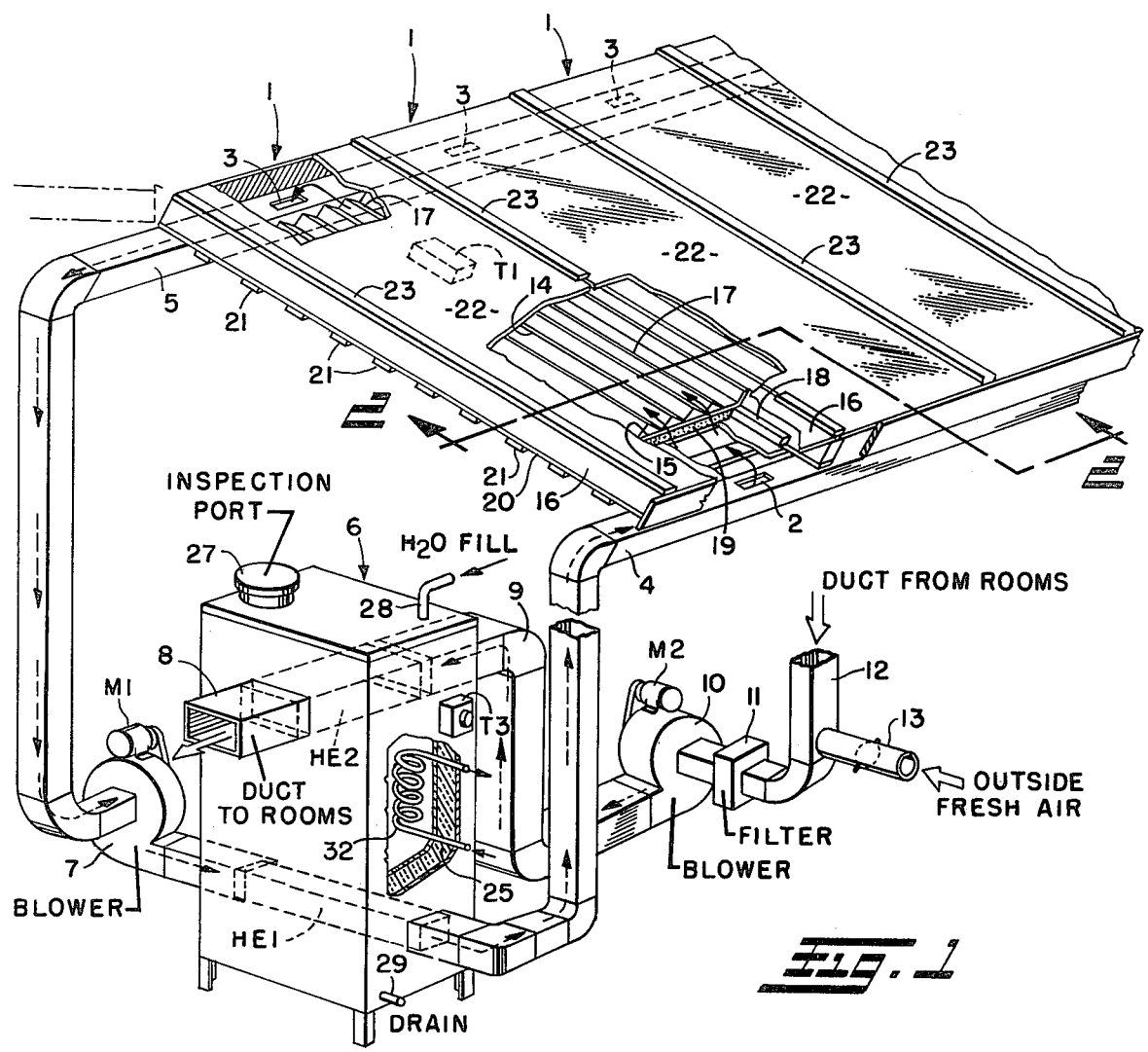
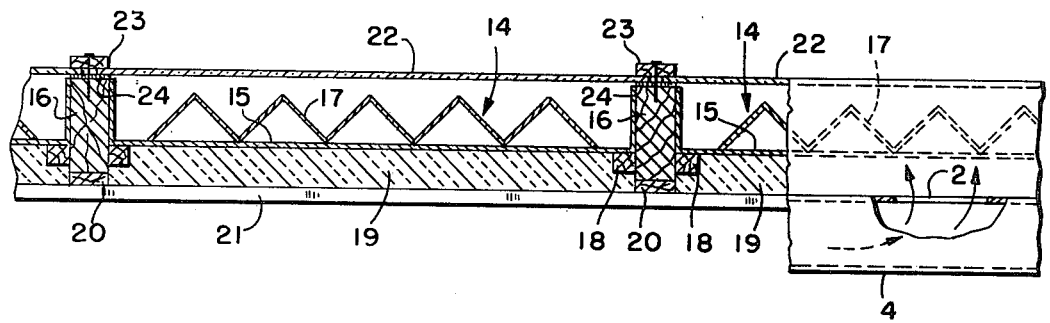

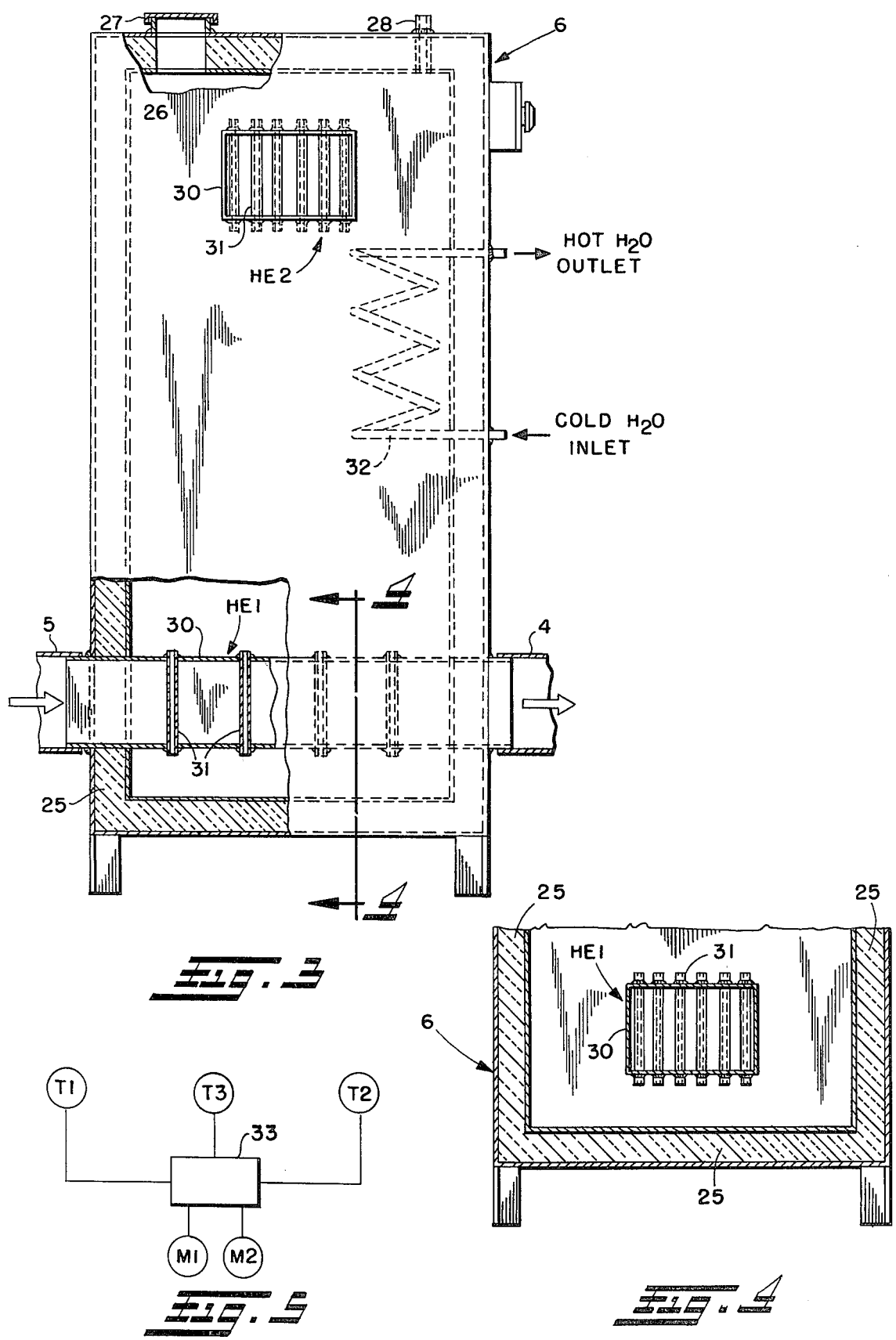

SOLAR HEATING SYSTEM

BACKGROUND OF THE INVENTION

Known solar heating systems are complex and expensive and are difficult to fabricate and install. Generally such systems employ a flat plate collector including one or more layers of glass over a blackened metal plate, air or water being circulated through tubes or over fins attached to the metal plate. The glass acts as a heat trap to let in the sun's rays but to keep most of the heat from escaping. The sun heats water or air circulating through the collector. If water is used in the collector, the heated water is stored in an insulated tank and is then pumped into the rooms through pipes and radiators and if air is used in the collector, the heat is stored in a bin containing crushed rocks heated by the hot air. When the house requires heat, air is blown through the rocks and into the house through hot air ducts.

In another known solar heating system a tank containing liquid in a heat storage bin is surrounded by non-liquid material such as stones or heat-of-fusion heat storage material. Liquid from the tank is pumped to the top of a solar heat collector and is spread out to flow down over the heat collector sheet for heating during the winter. The hot water is collected in a trough at the bottom of the collector and returns to the tank where the heat is stored and where it heats the non-liquid material. When heat is needed from storage a blower is turned on by a thermostat to blow air through the storage bin to warm the air.

Aside from the foregoing it is also known to provide various combined solar radiation collectors and thermal energy storage devices. In such device there is provided a collector for solar radiation and a reservoir containing a phase change matrix, a heat exchanger being positioned within the matrix for moving a heat absorbing medium through the heat exchanger for heating water, for example, for house heating purposes.

SUMMARY OF THE INVENTION

In contradistinction to known solar heating systems, the present system is a closed circuit system in which, during operation thereof, air is continuously circulated from the upper end of a flat plate collector through a heat exchanger in the lower portion of an insulated tank containing water which is heated by the hot air from the collector, and the air emanating from the heat exchanger is conducted to the lower end of the collector for reheating as it flows through the collector to the upper end thereof. The insulated heat storage tank has an upper heat exchanger through which air flows for room heating purposes.

In the solar heating system constituting the present invention the collectors and the heat storage device containing the heat exchangers are of simple inexpensive form while having improved efficiency over known collectors and heat exchangers.

Other objects and advantages will appear from the ensuing description.

BRIEF DESCRIPTION OF THE DRAWING

FIG. 1 is a perspective view of a preferred embodiment of this invention;

FIG. 2 is a cross-section view of a flat-plate solar heat collector taken substantially along the line 2—2 of FIG. 1;

FIG. 3 is an elevation view partly in cross-section showing the heat storage device and the heat exchangers therein;

FIG. 4 is a cross-section view taken substantially along the line 4—4 of FIG. 3; and FIG. 5 is a schematic diagram of control circuitry for storage of heat and for dispensing of heat for room heating purposes.

DETAILED DESCRIPTION OF A PREFERRED EMBODIMENT

As shown in FIG. 1, flat-plate solar heat collectors 1 are installed preferably in position to be inclined downwardly toward the south, each collector 1 having an air inlet opening 2 at its lower end and an air outlet opening 3 at its upper end. Extending transversely along the lower and upper ends of the collectors 1 are the respective ducts 4 and 5 (preferably of insulating construction) for supplying air to the inlet openings 2 and for conducting the heated air from the outlet openings 3.

Disposed on the first floor or basement of the house to be heated is an insulated heat storage tank 6 which is filled with water.

Extending through the lower portion of the heat storage tank 6 is a heat exchanger HE1, one end of the heat exchanger HE1 being connected to the duct 5 for the hot air including a fan or blower 7 operated by the motor M1. The other end of the heat exchanger HE1 is connected as shown to the duct 4 so that when the blower 7 is in operation under the control of a thermostat T1 associated with a collecter 1 and a thermostat T3 associated with the heat storage tank 6, air flows in a closed circuit or loop through the collectors 1 and heat exchanger HE1, the heat exchanger as hereinafter explained in detail being operative to heat the water in the heat storage tank 6.

For room heating purposes the upper portion of the heat storage tank 6 has upper heat exchanger HE2. One end of the heat exchanger HE2 is connected with a duct 8 leading to the rooms to be heated and the other end of the heat exchanger HE2 is connected to a duct 9 having a fan or blower 10 operated by the motor M2 under the control of a room thermostat T2 (see FIG. 5) and also the heat storage tank thermostat T3 (see FIG. 5). Upstream of the blower 10 inlet there may be provided the usual filter 11 which, if desired, may be of the electrostatic type or other known type. Upstream of the filter 11 is the cold air return duct 12 from the rooms and, in addition, fresh air may be introduced through the damper control duct 13.

Each of the collectors 1 as shown in FIGS. 1 and 2 as embodied in a roof sloping downward toward the south comprises an absorber 14 having a matte black sheet metal base 15 with upwardly extending sides overlying successive roof rafters 16 and a matte black corrugated metal sheet 17 which is welded or otherwise secured to the base 15. The absorber 14 is supported by wood strips 18 nailed or otherwise secured to the rafters 16. In the event that the rafters 16 are of insufficient depth to provide adequate thickness for thermal insulation material 19 such as rockwool, wood strips 20 may be nailed to the bottom edges of the rafters 16 and spaced apart strips 21 may be nailed in crosswise relation to the rafters 16 to retain the insulation 19 in place. Extending over the absorber is a glass plate 22 which is secured in place as by strips 23 nailed to the upper edges of the rafters 16 with sealing strips 24 of suitable resilient material interposed between the glass plate 22 and the rafter to seal the interior of the collector. If desired, the glass plate 22 may be of double pane construction with an air space between the layers of glass.

As evident when air flows from duct 4 into the collectors 1 through the inlet openings 2 it flows through the passages defined between the base 15 and the corrugated sheet 17 and also over the corrugations of the sheet 17. The absorbers 14 absorb heat from the sun's rays and accordingly hot air emerges from the outlet opening 3 of each collector 1 and flows through duct 5 for circulation by the blower 7 through the heat exchanger HE1, and the warm air from the heat exchanger HE1 is conducted by the duct 4 for recirculation and reheating as it flows through the collectors 1.

The heat storage tank 6 is shown in detail in FIGS. 3 and 4 and preferably comprises an upright double-wall tank with insulation 25 between the walls including, for example, a 5 cm. layer of rockwool or the like with an aluminum foil heat reflector and a 25 cm. layer of rigid urethane or like foam to effectively prevent heat loss from the tank 6 during extended periods of sunless days. For outdoor installation of tank 6 the outer wall may be of aluminum and for indoor installation the outer wall may be omitted, if desired. If desired, the upper wall may have an inspection opening 26 with a removable cover 27 which substantially closes the opening 26 while permitting entry and exit of air into and from the tank 6 as the water contracts and expands due to temperature decrease and increase. Appropriate filling and draining openings 28 and 29 are provided for filling and draining the tank 6 and a water-gage glass (not shown) may be provided on the tank 6 for observation of the water level.

The lower heat exchanger HE1 comprises a length of duct 30 extending through and welded to the opposite side walls of the tank 6 and having a longitudinally spaced series of vertical, laterally spaced apart open end tubes 31 of brass or steel welded or brazed to the top and bottom walls of the duct 30 so that as the hot air from the collectors 1 flows into the heat exchanger HE1, water in the tubes 31 and around the duct 30 is heated and rises by convection while water at lower temperature flows into the lower ends of tubes 31. The air at reduced temperature from the outlet of the heat exchanger HE1 is conducted by the duct 4 to the lower ends of the collectors 1 for reheating.

The heat exchanger HE2 may be of the same construction as that of heat exchanger HE1 and is preferably disposed in the upper portion of the heat storage tank 6 in crosswise relation to the heat exchanger HE1 and as air is heated for room heating purposes, the heat extracted from the hot water in the tank 6 by room air flowing through the heat exchanger HE2 effects a downward flow by convection through the vertical tubes 31. The crosswise dispositon of the heat exchangers HE1 and HE2 enhances convection flow of heat and promotes mixing without forced convection.

The heat storage tank 6 has therein a coiled water supply tube 32 from which hot water is supplied for domestic use in the kitchen, bathrooms and laundry room.

The control circuitry for the solar heating system herein is shown in FIG. 5 as comprising a collector thermostat or sensor T1, a room thermostat or sensor T2, and a storage thermostat or sensor T3 which are operatively connected to a differential switching circuit 33 so that the motor M1 for the collector blower 7 is energized only when the temperature sensed by the thermostat T1 is a predetermined number of degrees greater than the temperature of the water in tank 6 sensed by the thermostat T3. When the temperature of the water in the storage tank 6 reaches, say, 98° C., the thermostat T3 will operate a contact in the differential switching circuit 33 to deenergize the motor M1 to discontinue further heat transfer by the heat exchanger HE1. Similarly, when the room thermostat T2 demands heat, the motor M2 for the blower 10 for the room heating system will be energized provided that the storage thermostat T3 senses a storage water temperature greater than that demanded by the room thermostat T2. Accordingly, the motor M1 will not be energized during cloudy winter days or during winter nights and the motor M2 can only be energized when the heat exchanger HE2 is capable of transferring heat to the room air.

The embodiments of the invention in which an exclusive property or privilege is claimed are defined as follows:

1. A solar heating system comprising a hollow solar heat collector including a transparent top wall, a heat insulating bottom wall, and a heat absorber element between said walls to absorb heat from the sun's rays passing through said top wall and to heat air adapted to be circulated through said collector in contact with said element; a heat storage device including an insulated tank filled with liquid heat storage medium, and vertically spaced apart lower and upper heat exchangers having air passages extending through the lower and upper portions of said tank in heat exchange relation with said medium; air ducts intercommunicating said collector and lower heat exchanger in closed loop arrangement; blower means in one of said ducts operative, when energized, to induce flow of hot air from said collector through said lower heat exchanger for transfer of heat to said medium and back through said collector for re-heating of the air; and other air ducts and another blower means to conduct room air to be heated through said upper heat exchanger for transfer of heat stored in said medium to the room air and to conduct the heated room air from said upper heat exchanger to a room space; said lower and upper heat exchangers each comprising a length of metal duct surrounded by said medium and a series of longitudinally spaced banks of open-ended vertical and laterally spaced apart heat-conducting tubes filled with said medium whereby hot air from said collector flowing through said lower heat exchanger transfers heat to said medium around said duct and in said tubes of said lower heat exchanger, and whereby said upper heat exchanger transfers heat from said medium through said duct and vertical tubes of said upper heat exchanger to room air flowing through said upper heat exchanger.

2. The solar heating system of claim 1 wherein said lower and upper heat exchangers extend horizontally through said tank in crosswise relation to each other.

* * * * *